United States Patent
Miller et al.

(10) Patent No.: US 10,635,679 B2
(45) Date of Patent: Apr. 28, 2020

(54) SYSTEMS AND METHODS FOR PROVIDING FEEDBACK FOR NATURAL LANGUAGE QUERIES

(71) Applicant: LexisNexis, a division of Reed Elsevier Inc., Miamisburg, OH (US)

(72) Inventors: Richard D. Miller, Yellow Springs, OH (US); Todd J. Frascone, Donnelsville, OH (US); Jacob Aaron Myers, Dayton, OH (US)

(73) Assignee: RELX INC., New York, NY (US)

( * ) Notice: Subject to any disclaimer, the term of this patent is extended or adjusted under 35 U.S.C. 154(b) by 207 days.

(21) Appl. No.: 15/952,896

(22) Filed: Apr. 13, 2018

(65) Prior Publication Data

US 2019/0318009 A1    Oct. 17, 2019

(51) Int. Cl.
| | |
|---|---|
| *G06F 16/00* | (2019.01) |
| *G06F 16/2457* | (2019.01) |
| *G06F 16/93* | (2019.01) |
| *G06F 16/248* | (2019.01) |
| *G06F 16/242* | (2019.01) |

(52) U.S. Cl.
CPC ...... *G06F 16/24578* (2019.01); *G06F 16/243* (2019.01); *G06F 16/248* (2019.01); *G06F 16/24575* (2019.01); *G06F 16/93* (2019.01)

(58) Field of Classification Search
CPC .................................................. G06F 16/243
See application file for complete search history.

(56) References Cited

U.S. PATENT DOCUMENTS

| | | |
|---|---|---|
| 6,094,652 A | 7/2000 | Faisal |
| 6,223,145 B1 | 4/2001 | Hearst |
| (Continued) | | |

FOREIGN PATENT DOCUMENTS

| | | |
|---|---|---|
| EP | 1890243 A2 | 2/2008 |
| KR | 100980579 | 9/2010 |
| WO | 0237328 A2 | 5/2002 |

OTHER PUBLICATIONS

International Search Report & Written Opinion dated Jul. 28, 2015 in corresponding international application No. PCT/US2015/028500.

(Continued)

*Primary Examiner* — Ajith Jacob
(74) *Attorney, Agent, or Firm* — Dinsmore & Shohl LLP

(57) ABSTRACT

Systems, methods, and computer-readable media for providing for display an estimated breadth indicator and/or search terms proximity for a result set of documents are disclosed. A method includes receiving a natural language search query including a plurality of search concepts, determining the plurality of search concepts from the natural language query, searching a database using the natural language search query to identify the result set of documents, where the result set of documents are identified based on the plurality of search concepts, calculating a breadth of the result set of documents, where the breadth is calculated from an estimated relevance score that is indicative of a degree to which the result set of documents are relevant to the search query, and providing for display, the breadth as a feedback meter element. The feedback meter element provides a visual indication of the breadth of the natural language search query.

20 Claims, 7 Drawing Sheets

(56) References Cited

U.S. PATENT DOCUMENTS

| | | |
|---|---|---|
| 6,363,377 B1 | 3/2002 | Kravets et al. |
| 7,444,348 B2 | 10/2008 | Fries et al. |
| 8,280,900 B2 | 10/2012 | Pickens et al. |
| 8,849,817 B1 | 9/2014 | Mysen et al. |
| 8,965,872 B2 | 2/2015 | Hsu et al. |
| 2004/0039734 A1 | 2/2004 | Judd et al. |
| 2005/0091209 A1 | 4/2005 | Frank et al. |
| 2006/0224570 A1 | 10/2006 | Quiroga et al. |
| 2007/0106499 A1 | 5/2007 | Dahlgren et al. |
| 2007/0185863 A1 | 8/2007 | Budzik et al. |
| 2008/0275868 A1 | 11/2008 | Zer |
| 2010/0268710 A1 | 10/2010 | Strehl et al. |
| 2011/0106831 A1 | 5/2011 | Charur et al. |
| 2011/0131157 A1* | 6/2011 | Iyer .................... G06Q 30/0251 706/12 |
| 2011/0131241 A1 | 6/2011 | Peltrou et al. |
| 2012/0191705 A1 | 7/2012 | Tong et al. |
| 2014/0074826 A1* | 3/2014 | Cooper ............... G06F 17/2735 707/722 |
| 2014/0114962 A1 | 4/2014 | Rosenburg et al. |
| 2014/0156681 A1 | 6/2014 | Lee et al. |
| 2014/0207746 A1 | 7/2014 | Song et al. |
| 2015/0242512 A1 | 8/2015 | Lindahl et al. |
| 2015/0317320 A1 | 11/2015 | Miller et al. |

OTHER PUBLICATIONS

Office Action dated Feb. 22, 2016 in corresponding U.S. Appl. No. 14/267,340.
Office Action dated Aug. 2, 2016 issued in corresponding U.S. Appl. No. 14/267,340.
Notice of Allowance dated Dec. 29, 2016 in corresponding U.S. Appl. No. 14/267,340.
EESR dated Apr. 8, 2017 in corresponding international application PCT/US2015/028500.
PCT International Search Report and Written Opinion of the International Searching Authority for PCT/US19/26709, dated Apr. 10, 2019, 10 pages.

\* cited by examiner

SYSTEMS AND METHODS FOR PROVIDING FEEDBACK FOR NATURAL LANGUAGE QUERIES

BACKGROUND

Field

The present disclosure generally relates to providing search results in response to search queries and, more particularly, to systems and methods for improving search term suggestion feedback provided in natural language searches.

Technical Background

Users construct natural language search queries to search document databases (e.g., legal document databases, patent document databases, news article document databases, financial document databases, etc.) in order to identify documents that satisfy a search objective. There is a risk that users may construct ineffective natural language search queries that yield unsatisfactory result sets that do not satisfy the user's search objective. This may occur because the user did not input the proper terms that result in a satisfactory result set and/or a computer receiving the natural language query from the user does not accurately generate search concepts that are used as a basis for searching. A user may make poor or uninformed conclusions or decisions by erroneously relying on unreliable search results. A user may also waste significant time reviewing unsatisfactory results, which may not even include the documents that are most relevant to the user's search objective. A user may have no idea as to the relevance or usefulness of a set of documents identified by a natural language search query until the user spends a significant amount of time and effort reviewing the documents. Furthermore, it may be desirable to visualize and manipulate a natural language search query in an intuitive and user friendly manner.

SUMMARY

In one embodiment, a method for providing for display an estimated breadth indicator for a result set of documents includes receiving, at a computing device, a natural language search query including a plurality of search concepts, determining the plurality of search concepts from the natural language query, searching a database using the natural language search query to identify the result set of documents, where the result set of documents are identified based on the plurality of search concepts, calculating a breadth of the result set of documents, where the breadth is calculated from an estimated relevance score that is indicative of a degree to which the result set of documents are relevant to the search query, and providing for display, the breadth as a feedback meter element. The feedback meter element provides a visual indication of the breadth of the natural language search query.

In another embodiment, a method for providing for display an indicator of terms proximity for a result set of documents includes receiving, at a computing device, a natural language search query having a plurality of search concepts, determining the plurality of search concepts from the natural language query, searching a database using the natural language search query to identify the result set of documents, where the result set of documents are identified based on the plurality of search concepts, calculating a proximity of terms within the result set of documents, where the proximity of terms is calculated from a coverage of terms in a subset of relevant excerpts from the result set of documents, and providing for display, the proximity of terms as a feedback meter element. The feedback meter element provides a visual indication of the proximity of terms within the result set of documents generated from the natural language search query.

In another embodiment, a system for providing for display an estimated breadth indicator for a result set of documents includes a processing device and a non-transitory, processor-readable storage medium. The non-transitory, processor-readable storage medium includes one or more programming instructions thereon that, when executed, cause the processing device to receive a natural language search query including a plurality of search concepts, determine the plurality of search concepts from the natural language query, search a database using the natural language search query to identify the result set of documents, where the result set of documents are identified based on the plurality of search concepts, calculate a breadth of the result set of documents, where the breadth is calculated from an estimated relevance score that is indicative of a degree to which the result set of documents are relevant to the search query, and provide for display, the breadth as a feedback meter element. The feedback meter element provides a visual indication of the breadth of the natural language search query.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
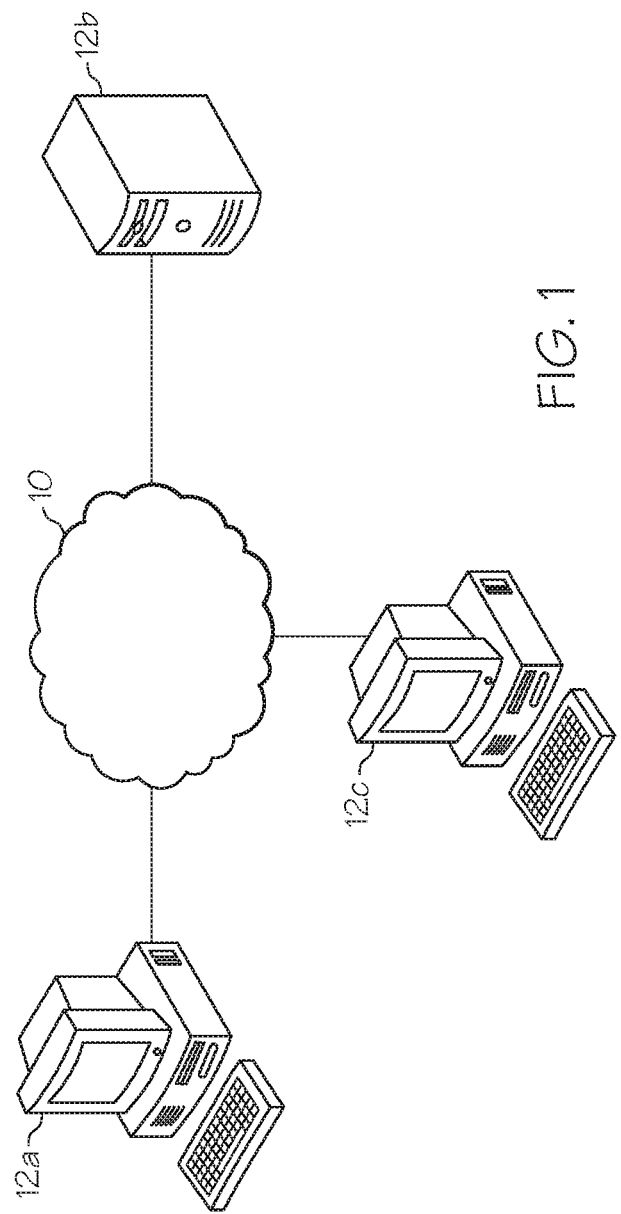
FIG. 1 schematically depicts an illustrative a computing network for a system for performing the functions described herein according to one or more embodiments shown and described herein.

Referring generally to the figures, embodiments described herein are directed to systems and methods for calculating a breadth of result sets of documents that are identified based on a natural language search query and/or calculating a proximity of search terms, and to systems and methods for displaying query visualizations. Some embodiments of the systems and methods described herein also display estimated breadth indicators for result sets of documents based on the calculated breadth and/or proximity indicators for excerpts from result sets of documents based on the calculated proximity. The displayed estimated breadth indicator/proximity indicator provides a visual indication of the degree to which the result set of documents are relevant to the natural language search query. Providing a visual indication of the degree to which a result set of document is relevant to a search query may allow a user to formulate improved queries, inspect more relevant documents, adjust for a desired breadth/proximity, and save time by reducing the amount of time spent inspecting irrelevant documents. For example, by providing a visual indication that a result set of documents is estimated as being broad and/or having sparse proximity, the embodiments described herein may alert a user that the result set may include certain irrelevant document and that the user should consider not wasting time inspecting irrelevant results. Conversely, by providing a visual indication that a result set of documents is estimated as being narrow and/or having dense proximity, the embodiments described herein may alert a user that the result set is likely to be relevant and that the user can proceed with inspection of the result set with confidence that wasted time will be reduced. However, such a visual indication may also alert a user that certain documents may not be included in the result set because of the narrow breadth and/or dense proximity. Additionally, providing a visual indication that a result set of documents is estimated to be narrow, broad, or some area in between (and/or dense, sparse, or some area in between) may signal that improvement of the natural language search query may or may not be required since the results may or may not be satisfactory to the user's search objective.

In some embodiments, at least one suggestion for improving a natural language search query is provided when the estimated relevance score is less than a relevance score threshold. Some embodiments provide for display a graphical user interface including a query input element, a query visualization and manipulation element, an estimated relevance element, and a results feedback element. Furthermore, the displayed query visualizations described herein may facilitate the visualization and manipulation of a natural language search query in an intuitive and user friendly manner. Various embodiments of systems and methods for calculating estimated relevance scores of result sets of documents, for displaying estimated relevance indicators for result sets of documents, and for displaying query visualizations are described below.

The use of natural language based search queries as described herein may provide an advantage over devices, systems, and methods that are directed to Boolean queries because natural language search queries provide insight into a user's intentions when conducting a search that cannot be discerned when a Boolean query is input. As such, the suggestions that are provided as a result of the analysis described herein more accurately represent what a user is attempting to find via search relative to suggestions that would be provided after analysis of a Boolean query.

Although the embodiments are described herein in the context of a document database including legal documents (e.g., cases, statutes, etc.), patent documents, news documents, financial documents, and the like, it should be understood that embodiments are not limited thereto.

Referring now to the drawings, FIG. 1 depicts an illustrative computing network, illustrating components for a system for performing the functions described herein, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to facilitate natural language based searching of a document database, display and receive input from a graphical user interface used to perform such natural language based searching, and display a result set of documents and information pertaining to the result set of documents (e.g., a list of suggested natural language terms that may be added to a natural language search query, a relevance indicator, and/or the like). The user computing device 12a may also facilitate the improvement of a search query by receiving and transmitting user input in response receiving and displaying suggestions for improving the search query from the server computing device 12b, which, as a result, improves the functionality of the computer by allowing the computer to provide search results that are more customized to a particular user's needs. The user computing device 12a may also be utilized to perform other user functions.

The administrator computing device 12c may, among other things, perform administrative functions for the server computing device 12b. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more documents into the document database.

The server computing device 12b may receive a natural language search query from the user computing device 12a and search a document database using the natural language search query to identify a result set of documents. The server computing device 12b may also determine potential natural language keywords to add to the natural language search query and/or calculate an estimated relevance score for the result set of documents that is indicative of a degree to which the result set of documents are relevant to a natural language search query. The server computing device 12b may also transmit information to the user computing device 12a such that the user computing device 12a may display the result set of documents and information pertaining to the result set of documents, such as an estimated relevance indicator. The components and functionality of the server computing device 12b will be set forth in detail below.

It should be understood that while the user computing device 12a and the administrator computing device 12c are depicted as personal computers and the server computing device 12b is depicted as a server, these are nonlimiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, etc.

Figure 2:
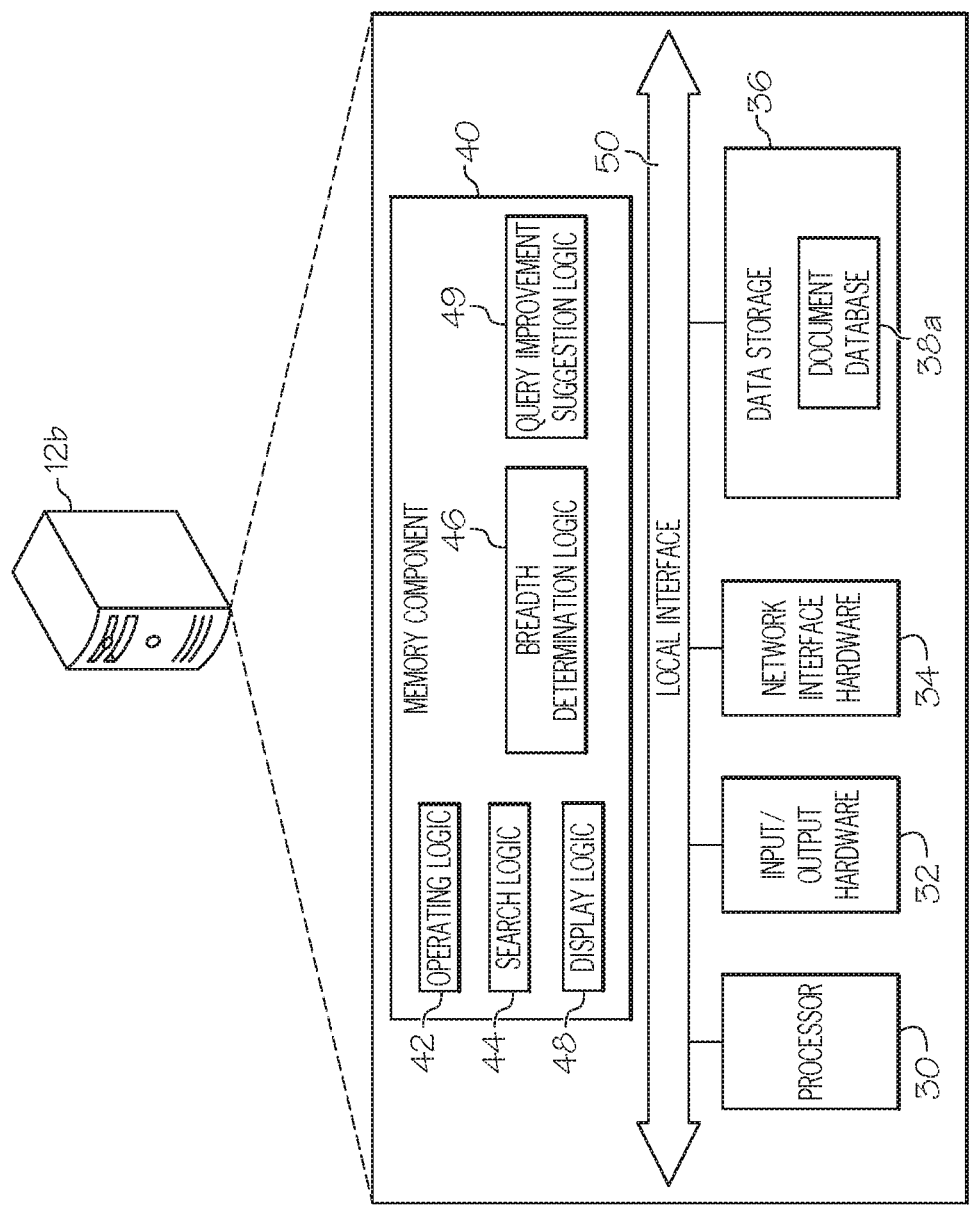
FIG. 2 schematically depicts illustrative hardware and software components of a server computing device that may be used to perform the functions described herein according to one or more embodiments shown and described herein.

FIG. 2 depicts additional details regarding the server computing device 12b from FIG. 1. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store a document database 38a), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, search logic 44, breadth determination logic 46, display logic 48, and query improvement suggestion logic 49 (each of which may be embodied as a computer program, firmware, or hardware, as an example). A local interface 50 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store the document database 38a, which in at least one embodiment includes documents that have been organized and indexed for searching. The document database 38a may be stored in one or more data storage devices. In another embodiment, the server computing device 12b may be coupled to a remote server or data storage device that comprises one or more of the documents in the document database 38a. Other data may be stored in the data storage component 36 to provide support for functionalities described herein.

Included in the memory component 40 are the operating logic 42, the search logic 44, the breadth determination logic 46, the display logic 48, and the query improvement suggestion logic 49. The operating logic 42 may include an operating system and/or other software for managing components of the server computing device 12b. Similarly, the search logic 44 may reside in the memory component 40 and may be configured to search the document database 38a based on natural language search queries received from the user computing device 12a. The breadth determination logic 46 may be operable to determine the most relevant documents and excerpts from search results that contain terms that are related to a natural language search query, and to extract associated information therefrom. The breadth determination logic 46 may also be operable to determine the proximity of terms within excerpts of results that are generated from the natural language query. The display logic 48 may facilitate the display of a graphical user interface usable by a user of the user computing device 12a to provide natural language search queries, to display visualizations of the natural language search queries, and to display of the result set of documents and information pertaining to the result set of documents, such as an estimated relevance indicator. The display logic 48 may facilitate such information displayed on the user computing device 12a by transmitting information that is displayed by the user computing device 12a. The query improvement suggestion logic 49 may generate a query improvement suggestion that is transmitted to the user computing device 12a for display to a user. The functionalities of the operating logic 42, the search logic 44, the breadth determination logic 46, the display logic 48, and the query improvement suggestion logic 49 will be described in further detail below.

It should be understood that the components illustrated in FIG. 2 are merely illustrative and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
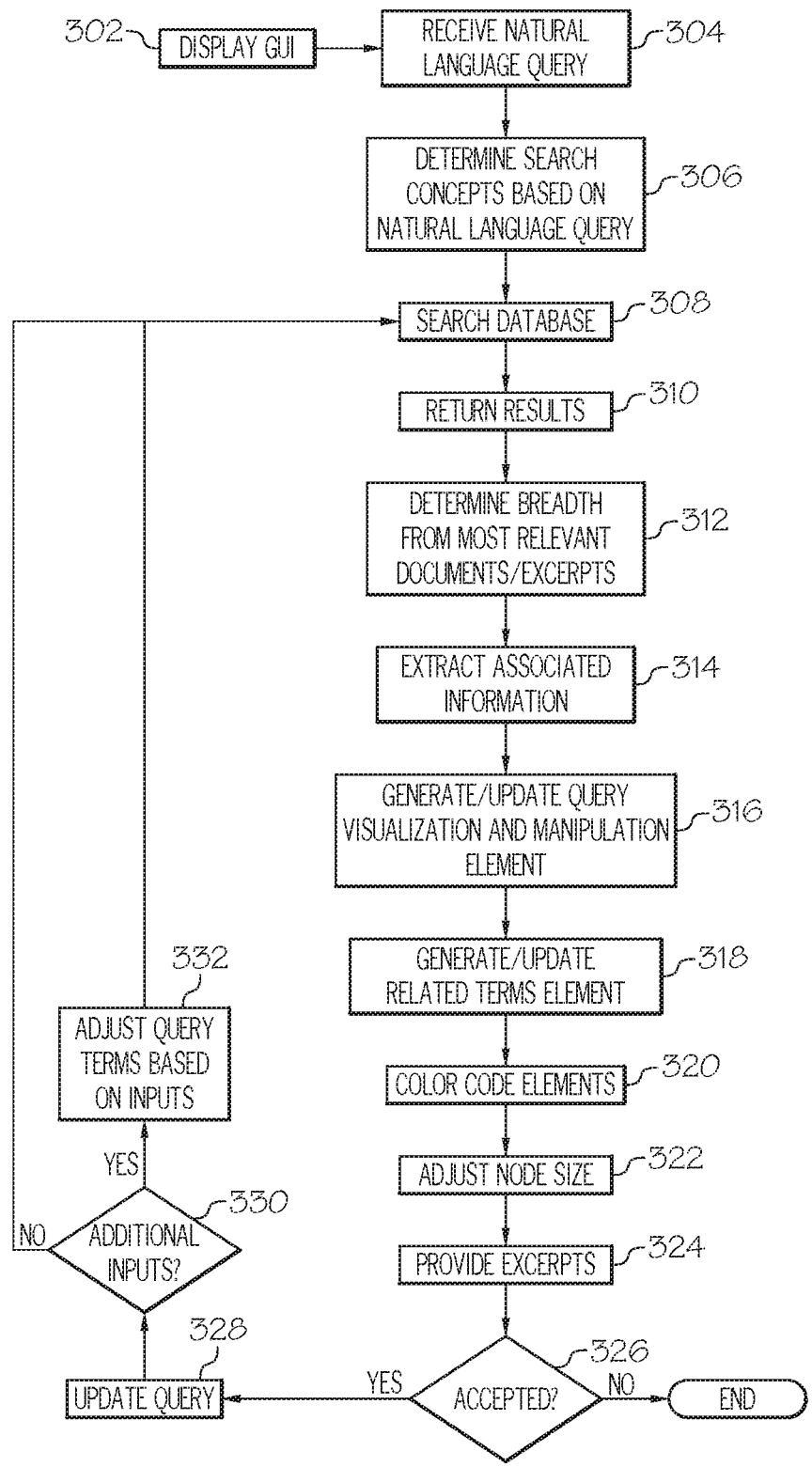
FIG. 3 depicts a flow diagram of an illustrative method of facilitating a natural language based search of a document database according to one or more embodiments shown and described herein.

Referring now to FIG. 3, a flow diagram that graphically illustrates a method 300 of facilitating a natural language search of a document database is provided. Although the steps associated with the blocks of FIG. 3 will be described as being separate tasks, in other embodiments, the blocks may be combined or omitted. Further, while the steps associated with the blocks of FIG. 3 will described as being performed in a particular order, in other embodiments, the steps may be performed in a different order.

Still referring to FIG. 3, at block 302, a graphical user interface is displayed. In some embodiments, the graphical user interface is displayed on a display device of the user computing device 12a. The graphical user interface may be displayed in response to an input received from the server computing device 12b, including one or more elements to be displayed in the graphical user interface. The server computing device 12b may generate data or information to be displayed with the display logic 48. The graphical user interfaces described herein may facilitate the generation of natural language search queries, the iterative refinement and manipulation of natural language search queries, and the understanding of the estimated relevance of query results in an intuitive and user-friendly manner such that a user may identify desired content and have confidence that the identified content is relevant. As such, the functionality of the various computing devices described herein is improved because they more accurately (or are more likely to) provide search results that relate to a particular user's needs, relative to computing devices that do not provide an iterative refinement and manipulation of natural language search queries. The graphical user interfaces described herein may be particularly useful when the user computing device 12a is a tablet device or smartphone. Furthermore, it should be understood that any of the graphical user interfaces and elements described herein may be embedded or integrated in various product features and at various points of a search process.

Figure 4:
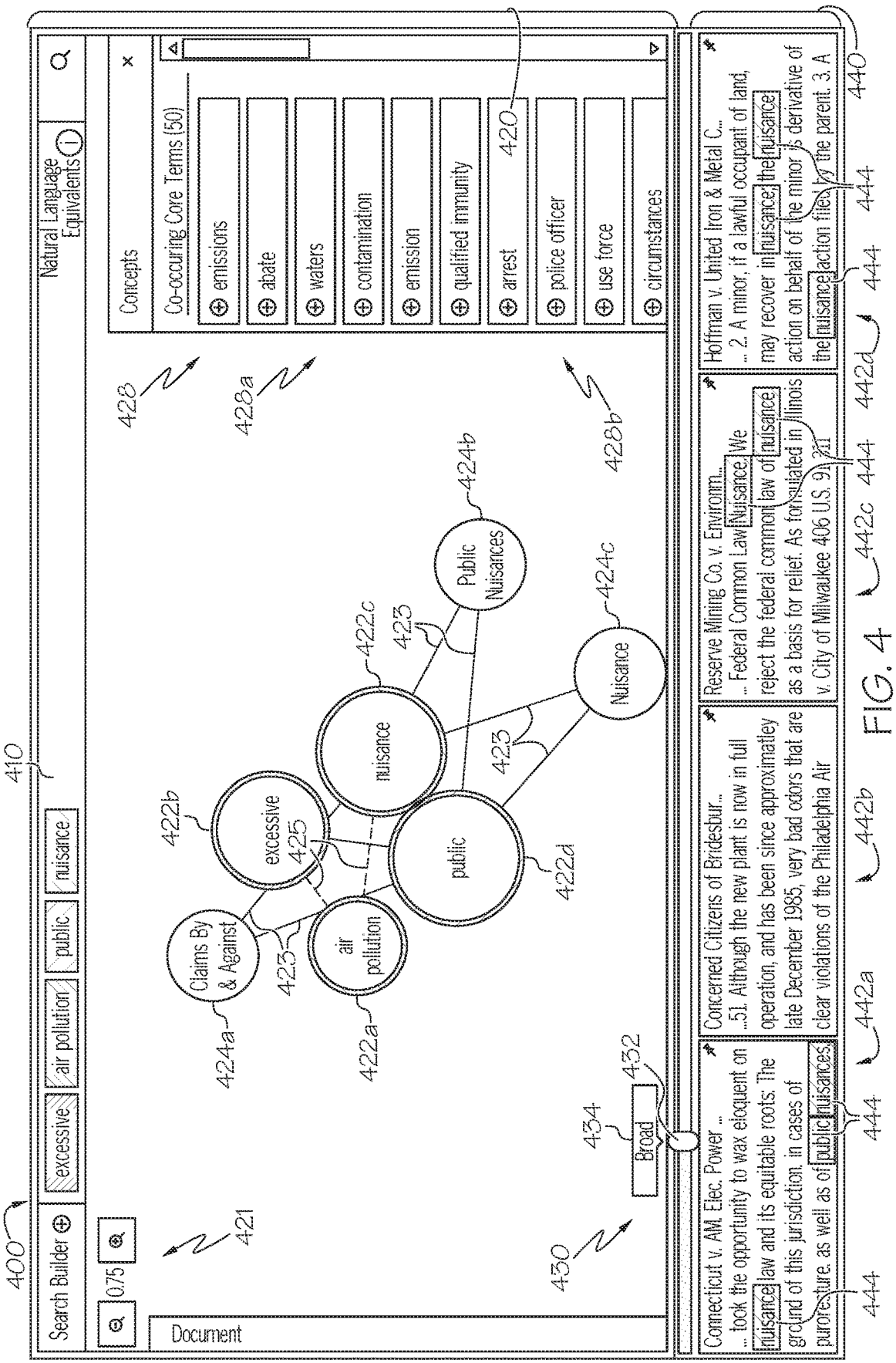
FIG. 4 depicts an illustrative graphical user interface including a natural language query input element, a query visualization and manipulation element, a results feedback element, and a results listing element according to one or more embodiments shown and described herein.

For example, a graphical user interface displayed in accordance with some embodiments is depicted in FIG. 4. It should be understood that embodiments are not limited to the configurations of the graphical user interfaces illustrated throughout the figures, and that other graphical user interface configurations are possible. In one embodiment, the computer network 10 is the Internet and the graphical user interfaces described herein are presented to the user on a display device of the user computing device 12a via a web browser.

Figure 7:
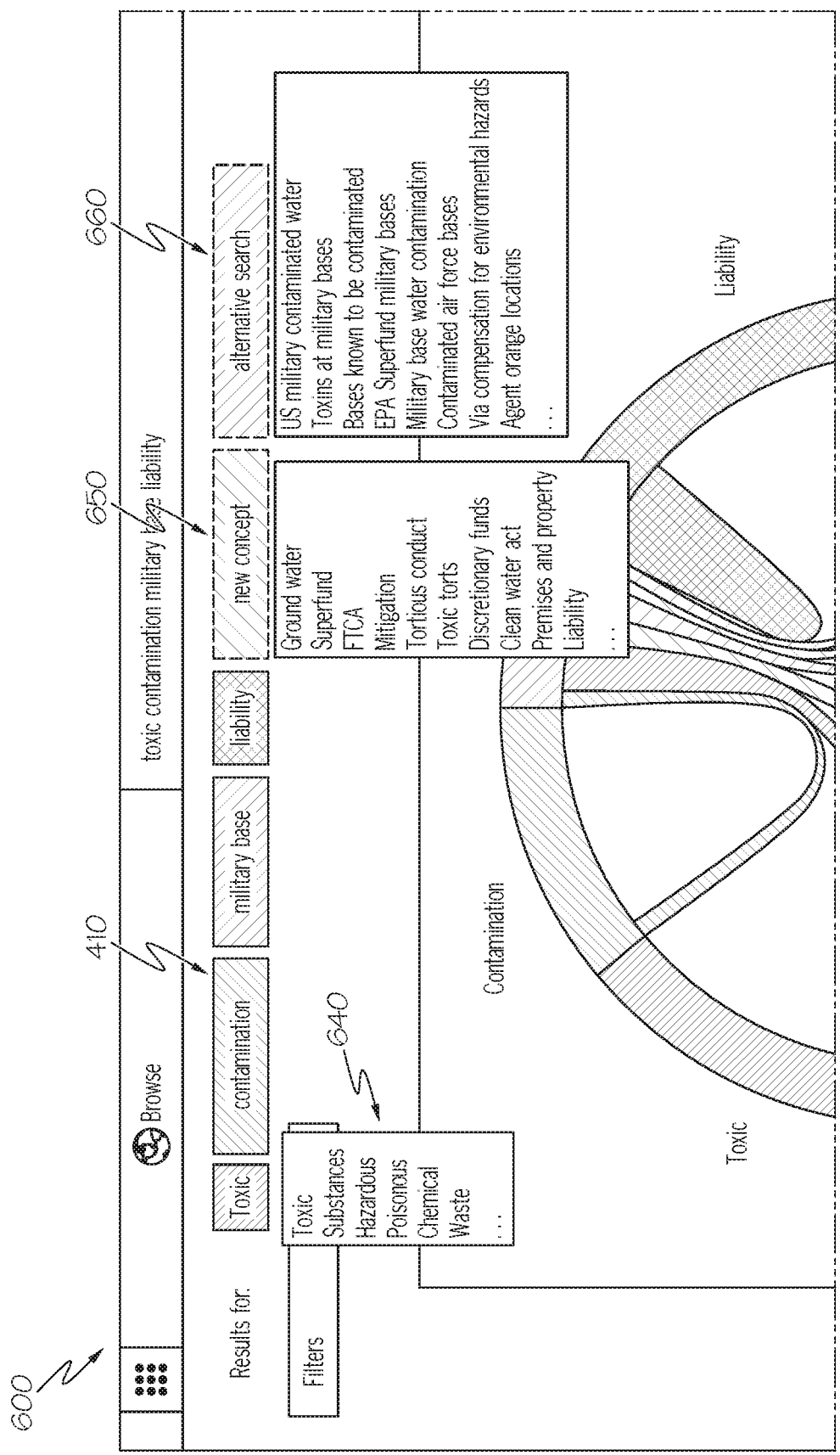
FIG. 7 depicts a detailed view of the query visualization and manipulation element of FIG. 6.

Referring to FIG. 4, the graphical user interface 400 includes a natural language query input element 410, a query visualization and manipulation element 420, a results feedback element 430, and a results listing element 440. The natural language query input element 410 is configured to request a submission of a natural language search query from a user. In some embodiments, text input may be provided in the natural language query input element 410, such as when a user can select the natural language query input element 410 as a field of entry and type text into the natural language query input element 410. In some embodiments, a user may have been presented a separate search screen (e.g., a user interface with a search box and a "search" button or a search box that immediately causes a search to run when text is inputted) used by the user to enter the search query, such as by typing the natural language search query into the search box or providing the natural language search query by speaking the search query into a microphone. It should be understood that the user may interact with the user interfaces provided herein via voice to provide the user with a natural interaction experience, which may be useful in some embodiments in which the user computing device 12a is a tablet or smartphone. In embodiments in which the search query is input via voice, the voice input may be translated, parsed, or processed in some manner by a speech recognition algorithm to produce the natural language search query. In some embodiments, the natural language query input element 410 may include one or more prompts or screens that may guide a user through various pieces of information used to construct the natural language search query (e.g., prompting a user to enter a practice area, a date range, a jurisdiction, or the like). For example, as shown in FIG. 7, a query term may be selected, highlighted, moused over, or the like to reveal a drop down box 640 containing alternative query terms. In addition, new concepts may be added in a new concepts box 650, which may include a drop down box with suggested new concepts. In addition, an alternative search box 660 may be provided along with a drop down box of suggested alternative searches that are semantically similar to the query presented.

Referring again to FIG. 4, the query visualization and manipulation element 420 may provide a visual representation of the search query that was input into the natural language query input element 410 and may facilitate the editing of the natural language search query. The query visualization and manipulation element 420 depicted in FIG. 4 includes a plurality of query term nodes 422a, 422b, 422c, 422d, (collectively query term nodes 422) and a plurality of topic nodes 424a, 424b, 424c (collectively topic nodes 424) coupled by a plurality of connectors 423. In addition, some of the query term nodes 422 may be connected to one another by a plurality of dashed connectors 425. In the embodiment depicted in FIG. 4, the query term nodes 422 are colored or otherwise marked differently with respect to one another to indicate the various terms determined from the natural language query, as described in greater detail herein. In addition, the topic nodes 424 are similarly colored with respect to one another, but differently colored from the query term nodes 422 such that a user can quickly discern whether a particular node is a query term node 422 or a topic node 424. It should be understood that the nodes may utilize different means of distinguishing between the various query term nodes 422 and the topic nodes 424 (e.g., shape, size, etc.) in other embodiments without departing from the scope of the present disclosure.

Each of the query term nodes 422 corresponds to a determined query term of the natural language search query that was input into a natural language search box, which resulted in the terms depicted in the natural language query input element 410. For example, if a user enters the question, "How much air pollution, if any, is considered to be excessive enough to be a public nuisance matter?", the terms that may appear in the natural language query input element 410 may be, for example, "excessive," "air pollution," "public," and "nuisance." Terms may also be grouped together via similarity or relatedness analysis process. This may occur with synonymous and related terms. Accordingly, each of the various query term nodes 422 are populated with each of the above mentioned terms. That is, query term node 422a graphically represents the "air pollution" query term derived from the natural language query. Query term node 422b graphically represents the "excessive" query term derived from the natural language query. Query term node 422c graphically represents the "nuisance" query term derived from the natural language query. Query term node 422d graphically represents the "public" query term derived from the natural language query.

Each of the query term nodes 422 is sized relative to the other nodes based on the relative prevalence of the terms among the most relevant portions (e.g., snippets) from each analyzed results document and any semantically related concepts contained in the topmost relevant documents that were returned during a search using the natural language query. For example, as shown in FIG. 4, query term node 422c (graphically representing the "nuisance" query term) and query term node 422d (graphically representing the "public" query term) are generally larger than query term node 422a (graphically representing the "air pollution" query term) and query term node 422b (graphically representing the "excessive" query term) because the extracted query terms "nuisance" and "public" (including any semantically similar terms) appear more in the topmost relevant documents that were discovered as a result of the search for "How much air pollution, if any, is considered to be excessive enough to be a public nuisance matter?" as described above than the extracted query terms "air pollution" and "excessive".

In addition, each of the query term nodes 422 may be further indicated as to the number of excerpts that relate to a particular query term and/or the level of co-occurrence of terms among extracted excerpts. For example, the thickness of the outline of each graphically depicted query term node 422 may be adjusted based on the number of excerpts that relate to that particular query term and/or the number of query terms that co-occur within the excerpts. That is, a thicker outline may indicate a relative greater number of excerpts/co-occurring terms, whereas a thinner outline may indicate a relative fewer number of excerpts/co-occurring terms.

It should be understood that semantically similar terms (e.g., query terms having a "semantic fit" with one of the query terms) may be determined and provided as the result of completing a semantic reasoning process for determining semantically similar query terms for a particular query term, determining one or more synonyms for a particular query term, one or more variants of a particular query term, or any combination of one or more query terms, one or more synonyms, and one or more variants. In some embodiments, a "semantic fit" may be determined based on a threshold score of similarity to the query terms extracted from the natural language query. That is, if a semantic query term exceeds a threshold, the semantic query term may be color coded or otherwise indicated in a similar manner to its related one of the query term nodes 422. If a semantic query term does not exceed the threshold, the semantic query term may be color coded or otherwise indicated in a different manner to the query term nodes 422 such that the term is distinguishable by a user when viewing the graphical user interface 400. A related terms element 428 of the graphical user interface 400 may include certain related terms that may be used as an alternative to or in addition to one or more of the query term nodes 422 based on a determination that such concepts have a semantic fit with the terms used in the search query, as described in greater detail herein.

The topic nodes 424 generally correspond to general topics that have been determined to be semantically similar to one or more of the query term nodes 422, as described in greater detail herein. For example, in the embodiment shown in FIG. 4, node 424a graphically represents a "claims by and against" topic. Node 424b graphically represents a "public nuisance" topic. Node 424c graphically represents a general "nuisance" topic. While topic nodes are described herein, it should be understood that the present disclosure is not limited solely to topics. That is, in some embodiments, other information may be used, such as, for example, entity names, names of statutes, legal topic/issue clusters (e.g., similar to topic nodes from a legal taxonomy), and/or the like.

Each of the connectors 423 connects one or more of the query term nodes 422 with one or more of the topic nodes 424. Accordingly, certain query term nodes 422 may share a related topic node 424. For example, both query term node 422d (graphically representing the "public" query term) and query term node 422c (graphically representing the "nuisance" query term) are connected via a connectors 423 to node 424c (graphically representing the "nuisance" topic), As such, the terms present in the query term nodes 422c, 422d are related with respect to nuisance type torts. In some embodiments, the length and/or the thickness of each of the connectors 423 may be adjusted to indicate a relationship. For example, the length and/or the thickness may be adjusted based on co-occurrence. That is, the length and/or thickness of each of the connectors 423 may represent what extent various elements co-occur within the most relevant parts of a document. For example, if "nuisance" and "public" co-occur frequently within the most relevant portions of the analyzed documents, the connector 423 between the "nuisance" topic node 424c and the "public" query term node 422d may be thicker relative to other terms that do not co-occur as often.

Each of the dashed connectors 425 connects between two of the query term nodes 422. Such a connection may represent the presence of the connected query terms in the same document returned as part of the search results and/or the same excerpt within a particular document. For example, the dashed connector 425 between query term node 422a (graphically representing the "air pollution" query term) and query term node 422b (graphically representing the "excessive" query term) indicate that the terms "air pollution" and "excessive" appear in at least one document returned as part of the search results and/or most frequently among the most relevant excerpts from the document set. In some embodiments, the length and/or the thickness of each of the dashed connectors 425 may be adjusted to indicate a relationship. For example, the length and/or the thickness may be adjusted based on co-occurrence. That is, the length and/or thickness of each of the dashed connectors 425 may represent what extent various elements co-occur within the most relevant parts of a document. For example, if "excessive" and "air pollution" co-occur frequently within the most relevant portions of the analyzed documents, the dashed connector 425 between the "excessive" query term node 422b and the "air pollution" query term node 422a may be thicker relative to other terms that do not co-occur as often.

Figure 5:
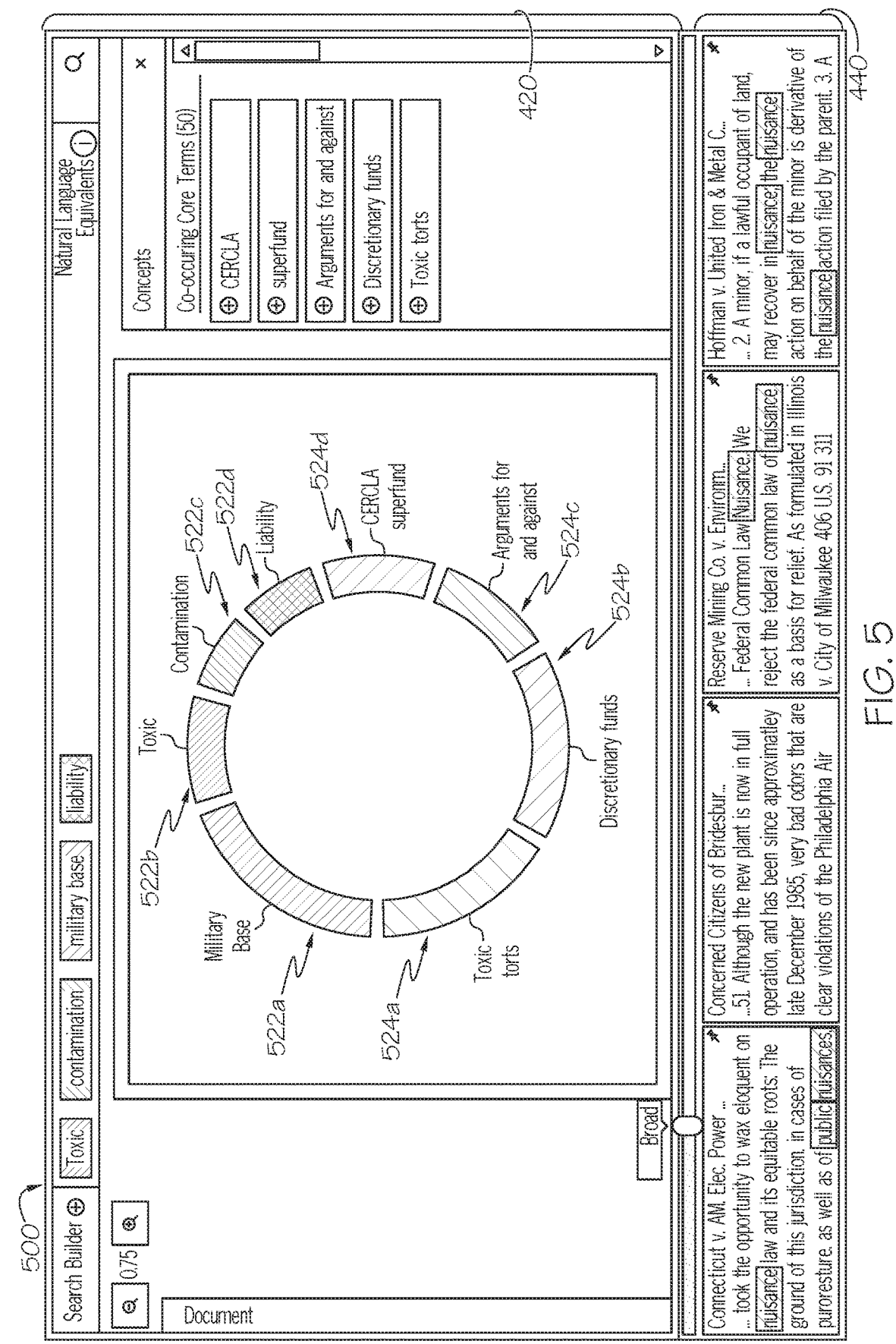
FIG. 5 depicts an illustrative graphical user interface including a query visualization and manipulation element having a pseudo-chord diagram according to one or more embodiments shown and described herein.

It should be understood that the query visualization and manipulation element 420, particularly the query term nodes 422, the topic nodes 424, the connectors 423 and/or the dashed connectors 425 are merely illustrative, and other means of facilitating a user's visualization of a natural language search query are contemplated. For example, FIG. 5 depicts the query visualization and manipulation element 420 may be a pseudo chord diagram having a plurality of query term sections 522a-d (collectively 522) and a plurality of topic sections 524a-d (collectively 524) that are arranged as a chord having a loop. For example, the embodiment depicted in FIG. 5 shows query term section 522a (graphically representing the "military base" query term), query term section 522b (graphically representing the "toxic" query term), query term section 522c (graphically representing the "contamination" query term), and query term section 522d (graphically representing the "liability" query term). In addition, the embodiment depicted in FIG. 5 shows topic section 524a (graphically representing the "toxic torts" topic), topic section 524b (graphically representing the "discretionary funds" topic), topic section 524c (graphically representing the "arguments for and against" topic), and topic section 534d (graphically representing the "CERCLA/Superfund" topic).

The relative sizes and/or proportions of the various query term sections 522 and/or the various topic sections 524 may correspond to the relative prevalence of the query terms and topics and/or any semantically similar terms and topics. For example, FIG. 5 depicts query term section 522a (graphically depicting the "military base" query term) as being larger/longer than query term section 522b (graphically depicting the "toxic" query term), which indicates that the "military base" query term is more prevalent than the "toxic" query term in the results list.

Similar to the embodiment described with respect to FIG. 4, the query term sections 522 depicted in FIG. 5 are also colored or otherwise marked differently with respect to one another to indicate the various terms determined from the natural language query, as described in greater detail herein. In addition, the topic sections 524 are similarly colored with respect to one another, but differently colored from the query term sections 522 such that a user can quickly discern whether a particular node is a query term section 522 or a topic section 524. It should be understood that the sections may utilize different means of distinguishing between the various query term sections 522 and the topic sections 524 (e.g., other shapes, sizes, etc.) in other embodiments without departing from the scope of the present disclosure.

Figure 6:
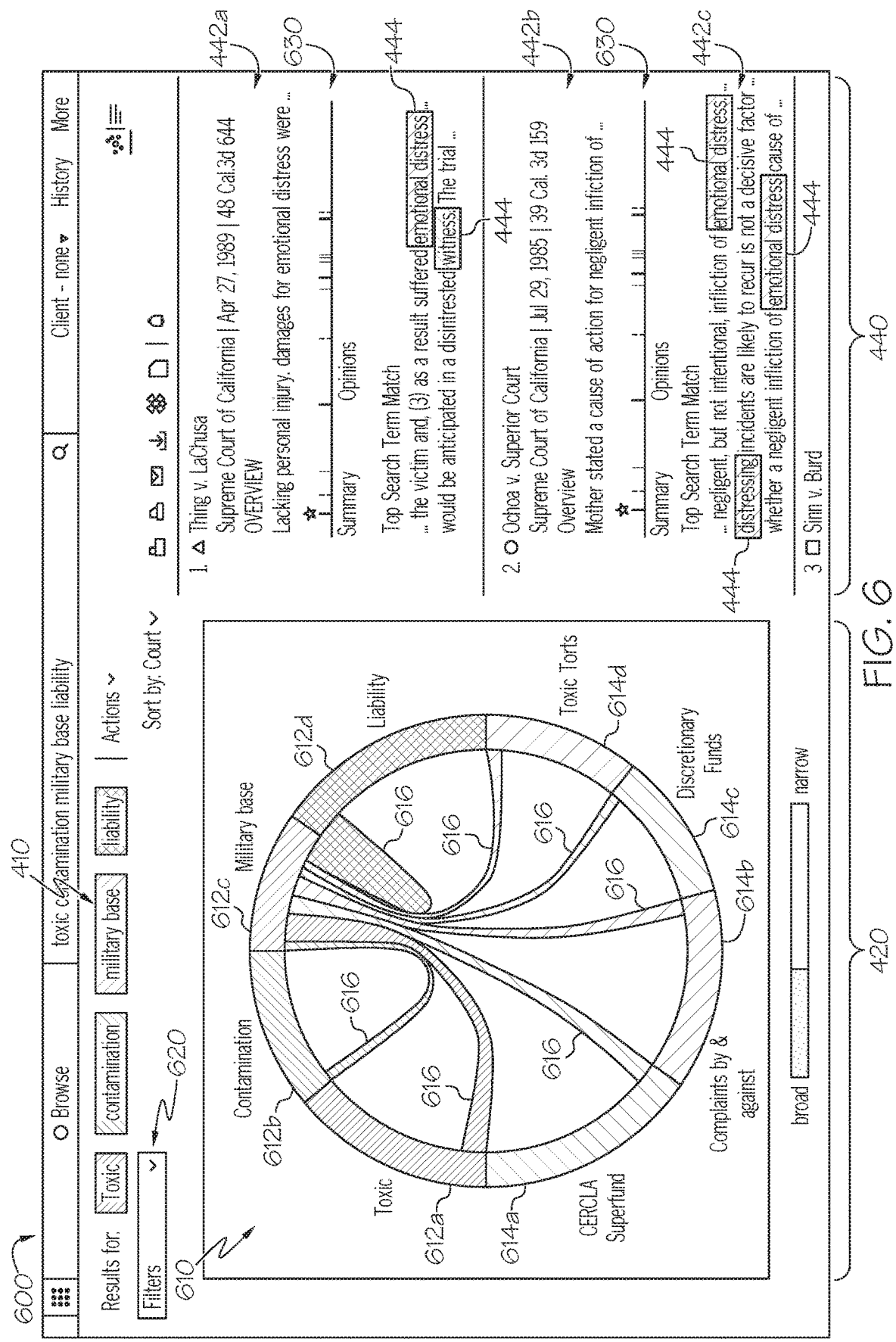
FIG. 6 depicts an illustrative graphical user interface including a query visualization and manipulation element having an alternative chord diagram and a document-level search terms proximity element according to one or more embodiments shown and described herein.

FIG. 6 depicts another example of the query visualization and manipulation element 420 that contains an alternative chord diagram 610. As particularly shown in FIG. 6, the alternative chord diagram 610 may include query term sections 612a, 612b, 612c, 612d (collectively, 612) and topic sections 614a, 614b, 614c, 614d (collectively, 614) arranged in a circular pattern. More specifically, the alternative chord diagram 610 may include a first query term section 614a (graphically representing the "toxic" query term), a second query term section 614b (graphically representing the "contamination" query term), a third query term section 614c (graphically representing the "military base" query term), and a fourth query term section 614d (graphically representing the "liability" query term). In addition, the alternative chord diagram 610 may include a first topic section 614a (graphically representing the "CERCLA Superfund" topic section), a second topic section 614b (graphically representing the "complaints by and against" topic section), a third topic section 614c (graphically representing the "discretionary funds" topic section), and a fourth topic section 614d (graphically representing the "toxic torts" topic section). The relative lengths of each of the query term sections 612 and the topic sections 614 may be based on the prevalence of the respective query term or topic in the portions of the documents that were analyzed. Thus, a term or topic that is more prevalent relative to another term or topic will include a larger portion of the circle (e.g., the first topic section 614a is larger than the third topic section 614c because the term "toxic" is more prevalent than the term "military base".

Each of the query terms sections 612 and the topic sections 614 may be interconnected by connective lines 616. A connective line 616 between respective sections may generally relate to a co-occurrence of the query terms and/or topic sections in the analyzed portions of the search results. In addition, the thickness of a connective line 616 may indicate the prevalence of co-occurrence between terms. For example, a connective line 616 between the first query term section 612a and the second query term 612b may be thicker than another connective line 616 between the first query term 612a and the third query term 612c, which indicates that the first query term and the second query term co-occur more often than the first query term and the third query term. While FIG. 6 does not show all of the connective lines 616, it should be understood that a greater number (up to all) of the connective lines 616 or a lesser number (down to none) of the connective lines 616 may be displayed. In some embodiments, the number of connective lines 616 may be determined by a user, such as by selecting a drop down box, clicking a button, hovering a mouse pointer over a particular query term section 612 or topic section 614, and/or the like.

Query terms may also be filtered using a "filters" graphical element selector 620. Such a graphical element selector 620 may allow a user to temporarily add or remove query terms and/or topics to discern how it affects the relationship between other query terms and/or topics.

Referring again to FIG. 4, the query visualization and manipulation element 420 includes a related terms element 428. The related terms element 428 displays one or more terms related to one or more of the search terms in the search query. In some embodiments, the related terms element 428 may be arranged according to terms that are expected to be the most helpful to a user. As such a first group 428a of useful terms may be determined to be more useful than a second group 428b of terms. The usefulness of terms included within the related terms element 428 may be determined based on an analysis of the natural language search query. That is, the natural language search query is analyzed to determine what a user is looking for, and terms that most closely match the search query terms in the same context may be determined to be more useful than other terms that do not match or are not as closely matched. The user may add one or more of the related terms to the query by adding the term to the query input box, dragging the term to create a node next to the nodes and connectors of the query, or the like. In some embodiments, the related terms are generated by the server computing device 12b based on one or more query terms of the search query transmitted from the user computing device 12a to the server computing device 12b. In such embodiments, the server computing device 12b transmits the related terms to the user computing device 12a for display on the user computing device 12a.

As also depicted in FIG. 4, the query visualization and manipulation element 420 may also include a zoom tool 421. The zoom tool generally allows a user to focus in on one or more particular queries and/or topics in order to see connections between the particular queries and/or topics. For example, if the query visualization and manipulation element contains a large number of query term nodes 422 and/or a large number of topic nodes 424, some or all of which are connected via connectors 423 and dashed connectors 425, it may be difficult for a user to discern which of the query term nodes 422 and/or topic nodes 424 are connected together. As such, the user may utilize the zoom tool 421 to "zoom in" on a portion of the query visualization and manipulation element 420 to only view a portion of the query term nodes 422 and/or the topic nodes 424 in a detailed view such that certain connectors 423 and/or dashed connectors 425 are viewable. In another example, a user may desire to view a "big picture view" to get a sense of which query term nodes 422 are connected to the most topic nodes 424 or vice versa. As such, the user may utilize the zoom tool 421 to "zoom out" such that all of the contents of the query visualization and manipulation element 420 can be viewed at once. It should be understood that the zoom tool 421 may be omitted in some embodiments, and that the zoom tool 421 may be optionally included in other embodiments, such as the embodiments depicted with respect to FIGS. 5 and 6.

In some embodiments, the graphical user interface 400 may include a feedback meter element 430 that includes an indicator element 432 and/or a textual indicator 434. The feedback meter element 430 may generally allow a user of the graphical user interface 400 to view a scope of the search results and/or view the proximity of the search terms within particular excerpts of the results set, as described herein. As such, when the indicator element 432 and/or the textual indicator 434 is disposed towards a first direction (e.g., towards a left side of the graphical user interface 400), the feedback meter element 430 may indicate a broader scope or specificity of the query terms and/or topics (and/or a sparser proximity of search terms). In addition, when the indicator element 432 and/or the textural indicator 434 is disposed towards a second direction (e.g, towards a right side of the graphical user interface 400), the feedback meter element 430 may indicate a narrower scope or specificity of the query terms and/or topics (and/or a denser proximity of search terms). The textual indicator 434 generally provides information to the user that corresponds to the location of the indicator element 432. For example, if the indicator element 432 is located at or near the left side of the graphical user interface 400, the textual indicator 434 may indicate that the scope or specificity is broad by graphically displaying the word "broad" and/or may indicate that the proximity of search terms is sparse by displaying the word "sparse". In addition, if the indicator element 432 is located at or near the right side of the graphical user interface 400, the textual indicator 434 may indicate that the scope or specificity is narrow by graphically displaying the word "narrow" and/or may indicate that the proximity of search terms is dense by displaying the word "dense". It should be understood that the indicator element 432 and the textual indicator 434 are merely examples, and other means of allowing the user quickly determine the breadth or specificity of the query term suggestions and/or topic suggestions, and/or the proximity of search terms are included within the scope of the present disclosure. For example, an alternative feedback meter element 430' is depicted in FIG. 6.

Still referring to FIG. 4, the graphical user interface 400 includes a results listing element 440. The results listing element 440 may display a preview or otherwise display of a result set of documents identified by searching the document database with the search query, including a first document result 442a, a second document result 442b, a third document result 442c, and a fourth document result 442d. In one embodiment, the results listing element 440 provides preview or other display of a subset of the result set of documents. In another embodiment, all of the returned electronic documents are provided in results listing element 440. A scroll bar (not shown) may be provided to enable the user to scroll through the returned electronic documents. The visual indication of the displayed documents may take on a variety of forms. In some embodiments, such as the embodiment depicted in FIG. 4, a document identifier and a relevant portion of the text within the document may be displayed. Other visual representations are also possible. The graphical user interface 400 also includes one or more highlighted hits 444 within each document, wherein each of the highlighted hits 444 indicates a term within a particular document that corresponds to one of the query terms. In some embodiments, the highlighted hits 444 may be colored or otherwise indicated in a manner that allows a user to quickly determine which of the query terms is highlighted. For example, each of the highlighted hits 444 may be colored or otherwise indicated to match a color or indication of each of the query term nodes 422. That is, if query term node 422c (graphically representing the "nuisance" query term) is indicated with green coloring in query visualization and manipulation element 420, then any time the word "nuisance" (or any other semantically similar terms that are selected) is graphically depicted in the results listing element 440, the word "nuisance" may be indicated in the color green as one of the highlighted hits 444.

It should be understood that the results listing element 440 is merely illustrative, and other means of displaying the results may also be used without departing from the scope of the present disclosure. For example, the results listing element 440 may be presented with a search terms proximity indicator, as shown in FIG. 6. More specifically, the results listing element depicts each of the document results 442 to the side of the query manipulation and visualization element 420. Each of the highlighted hits 444 are depicted in addition to a search terms proximity indicator 630 for each document result 442. The search terms proximity indicator 630 may graphically indicate the proximity of particular query terms within the document so as to allow a user to quickly recognize the location of search terms within the document and in relation to one another, as well as allow a user to quickly scroll to a portion of a document where a particular search term is located.

Referring once again to FIG. 3 (and FIG. 1), at block 304, a natural language search query may be received. In some embodiments, the natural language search query received at block 304 may have been entered into a query input element of the graphical user interface 400 (FIG. 4) displayed by the user computing device 12a, transmitted from the user computing device 12a to the server computing device 12b in response to initiation of the search by a user (e.g., by pressing enter or selecting a search initiation icon or by entering text, which is automatically searched), and received by the server computing device 12b. From the natural language search query, a plurality of search concepts (e.g., terms) may be extracted using any natural language query extraction algorithm now known or later developed at block 306. Such a natural language query extraction algorithm may be executed by the user computing device 12a and/or the server computing device 12b, and the extracted query terms may be populated within the natural language query input element 410 of the graphical user interface 400 (FIG. 4). Illustrative natural language query extraction algorithms should generally be understood and are not described in greater detail herein. For example, referring to FIGS. 1 and 4, a search query of "How much air pollution, if any, is considered to be excessive enough to be a public nuisance matter?" may result in terms "excessive," "air pollution," "public," and "nuisance" being extracted and entered into the natural language query input element 410 of the graphical user interface 400 displayed by the user computing device 12a.

Referring once again to FIGS. 2 and 3, at block 308, the server computing device 12b may use the search logic 44 to search the document database 38a to identify a result set of document that are identified based on the search terms/concepts determined at block 306. The search logic 44 may employ a search algorithm that identifies the result set of documents as the documents in the document database 38a that include one or more of the query terms of the search query and satisfy any additional constraints associated with the search query, such as content type, proximity of terms, or the like. A variety of search algorithms may be employed by the search logic 44. As such, the present disclosure is not limited to any particular search algorithm.

At block 310, the server computing device 12b may return search results. In addition, the server computing device 12b may use the breadth determination logic 46 to determine the breadth of the search results from the most relevant documents and/or excerpts from the search results, and/or determine the proximity of terms from excerpts from the search results at block 312, and extract associated information at block 314. In some embodiments, determining the breadth of the search results from the most relevant documents and/or excerpts, and/or determining the proximity of terms from excerpts from the search results may be based on an estimated relevance score. The estimated relevance score may be calculated as described in the following sections.

Calculation of the Estimated Relevance Score Based on Context Characters

When the estimated relevance score of a particular excerpt is calculated based on one or more context characteristics, the server computing device 12b may determine one or more context characteristics that are indicative of a context of the search query and then calculate the estimated relevance score based on the one or more context characteristics.

The one or more context characteristics may include a user profile, which may include such information as a user identifier, a practice area, a jurisdiction, user preferences, or the like. In some embodiments, the estimated relevance score is calculated based on the user profile. For example, the estimated relevance score may be calculated as higher based on the user profile (e.g., by calculating the estimated relevance score as higher when a high proportion of the result set of documents are from the practice area included in the user profile) or may be calculated as lower based on the user profile (e.g., by calculating the estimated relevance score as lower when a lower proportion of the result set of documents are from the practice area included in the user profile). In some embodiments, the estimated relevance score may be calculated based on a plurality of weighted score components, including a user profile component that is calculated based on the user profile. In some embodiments, the estimated relevance score may be calculated as another function of the user profile.

The one or more context characteristics may include a device type, which may indicate whether the user computing device 12a is a personal computer, a laptop computer, a tablet, a smartphone, or the like. In some embodiments, the estimated relevance score is calculated based on the device type, such as when the estimated relevance score is only calculated or utilized when the device type is a tablet or smartphone.

The one or more context characteristics may include a geographic location or a network location. In some embodiments, the estimated relevance score is calculated based on the geographic location or network location. For example, the estimated relevance score may be calculated based on a geographic location indicative of a user being away from an office or a geographic location indicative of a user being in an office. In some embodiments, the estimated relevance score is calculated based on the geographic location or network location, such as when the estimated relevance score is only calculated or utilized when the user is away from the office.

Calculation of the Estimated Relevance Score Based on Query Characteristics

When the estimated relevance score of a particular excerpt is calculated based on one or more query characteristics, the server computing device 12b may determine one or more query characteristics that are indicative of a characteristic of the natural language search query and then calculate the estimated relevance score based on the one or more query characteristics.

The one or more query characteristics may include a number of query terms extracted from the natural language search query. In some embodiments, the estimated relevance score is calculated based on the number of query terms. For example, the estimated relevance score may be calculated as proportional to the number of query terms. In some embodiments, the estimated relevance score may be calculated as a bell-shaped function of the number of query terms, such that the estimated relevance score is lower when there are a low number of query terms (e.g., 3 or less query terms), higher when there are a medium number of query terms (e.g., 4 to 7 query terms), and lower when there are a high number of query terms (e.g., 8 or more query terms). In some embodiments, the estimated relevance score may be calculated based on a plurality of weighted score components, including a number of query terms component. In some embodiments, the estimated relevance score may be calculated as another function of the number of query terms.

The one or more query characteristics may include an inclusion of a recognized phrase. In some embodiments, the estimated relevance score is calculated based on the inclusion of a recognized phrase. For example, the estimated relevance score may be calculated as higher when the query terms extracted from the natural language search query include a recognized phrase, such as the recognized legal phrase "adverse possession," "eminent domain," "fiduciary duty," or the like. The estimated relevance score may be calculated as lower when the extracted terms from the natural language search query do not include a recognized phrase, such as when the extracted terms include disjointed query terms that are not part of one or more recognized phrases. In some embodiments, one or more recognized phrases may be stored in the data storage component 36 or the memory component 40 of the server computing device 12b. In some such embodiments, the estimated relevance score is calculated based on whether the search query includes at least one of the recognized phrases stored in the data storage component 36 or the memory component 40. In some embodiments, the estimated relevance score may be calculated based on a plurality of weighted score components, including an inclusion of a recognized phrase component. In some embodiments, the estimated relevance score may be calculated as another function of the inclusion of a recognized phrase.

The one or more query characteristics may include an inclusion of a citation. In some embodiments, the estimated relevance score is calculated based on the inclusion of a citation. For example, the estimated relevance score may be calculated as higher when the natural language search query and/or the extracted terms include a citation. The estimated relevance score may be calculated as lower when the natural language search query and/or the extracted terms does not include a citation. In the context of a legal natural language search query used to search legal documents contained in the document database 38a of the server computing device 12b, the estimated relevance score may be calculated as higher when the natural language search query and/or the extracted terms include a legal citation, such as a citation to a court case, a citation to a statute, or the like. Conversely, the estimated relevance score may be calculated as lower when the natural language search query and/or the extracted terms does not include a legal citation. In some embodiments, the estimated relevance score may be calculated based on a plurality of weighted score components, including the inclusion of a citation component. In some embodiments, the estimated relevance score may be calculated as another function of the inclusion of a citation.

The one or more query characteristics may include an inclusion of a search filter. In some embodiments, the estimated relevance score is calculated based on the inclusion of the search filter. For example, the estimated relevance score may be calculated as higher when the search query includes a search filter. The estimated relevance score may be calculated as lower when the search query does not include a search filter. The search filter may be a date range filter, such as when a user limits the search to a particular date range by entering a date range in the query input element or selects a date range from a drop down box or other filter. The search filter may be a jurisdiction filter, such as when a user limits the search to cases or statutes from a particular jurisdiction by entering a jurisdiction in the query input element or selecting a jurisdiction from a jurisdiction drop box. The search filter may be a content type filter, such as when a user limits the search to a particular content type (e.g., cases, statutes, law review articles, or the like) by entering a content type in the query input element or selecting a content type from a content type drop box. The search filter may be a practice area filter, such as when a user limits the search to documents from a particular practice area (e.g., torts, intellectual property, real property, criminal law, constitutional law, or the like) by entering a practice area in the query input element or selecting a practice area from a practice area drop box. It should be understood that the estimated relevance score may be calculated based on a variety of additional filters that may be applied to the search query other than the filters specifically described herein.

The one or more query characteristics may include an ambiguity score. In some embodiments, the estimated relevance score is calculated based on the ambiguity score. The ambiguity score provides a measurement of how ambiguous a natural language search query and/or the extracted terms therefrom are based on their linguistics. In some embodiments, the server computing device 12b uses query ambiguity determination logic stored in the memory component 40 to analyze the ambiguity of the natural language search query and/or the extracted terms and to calculate the ambiguity score. In some embodiments, the estimated relevance score may be calculated based on a plurality of weighted score components, including an ambiguity score component. In some embodiments, the estimated relevance score may be calculated as another function of the ambiguity score.

The one or more query characteristics may include a degree of query similarity. The degree of query similarity is indicative of a degree of similarity to at least one previous natural language search query and/or terms extracted therefrom. For example, the degree of query similarity may be a degree of similarity to a previous natural language search query and/or terms extracted therefrom by another user in a similar context (e.g., in the same content area, in the same practice area, or the like). The degree of query similarity may be a degree of similarity to a previous natural language search query and/or terms extracted therefrom that identified a result set from which information was captured, as evidenced by a user downloading, printing, e-mailing, or saving documents from the previously identified result set or content from the documents of the previously identified result set. The degree of query similarity may be a degree of similarity to a previous natural language search query and/or terms extracted therefrom that identified a result set from which documents were analyzed, as evidenced by a user performing a citation analysis, highlighting, annotating, or viewing documents from the previously identified result set or content from the documents of the previously identified result set. The estimated relevance score may be calculated based on the degree of query similarity. For example, the estimated relevance score may be calculated as higher when the natural language search query and/or terms extracted therefrom are similar to a previous natural language search query and/or terms extracted therefrom that included a result set from which documents or content of the documents of the result set was downloaded, printed, e-mailed, saved, or the like. In some embodiments, the estimated relevance score may be calculated based on a plurality of weighted score components, including a degree of query similarity component. In some embodiments, the estimated relevance score may be calculated as another function of the degree of query similarity.

Calculation of the Estimated Relevance Score Based on Results Characteristics

When the estimated relevance score is calculated based on one or more results characteristics, the server computing device 12b may determine one or more results characteristics that are indicative of the result set of documents and then calculate the estimated relevance score based on the one or more results characteristics.

The one or more results characteristics may include a terms relevance. The terms relevance may be indicative of an extent to which the extracted query terms of the natural language search query match one or more terms in at least one document of the result set of documents. The terms relevance may be calculated by calculating a term frequency-inverse document frequency ("tf-idf") for each of the extracted query terms in the natural language search query in each of the documents in the result set of documents and then using the calculated tf-idf values to determine the estimated relevance score. The estimated relevance score may then be calculated based on the terms relevance calculations for one or more of the documents in the result set. The estimated relevance score is calculated based on the terms relevance in a variety of ways, such as when the estimated relevance score is calculated based on an average relevance per document of the result set, based on an average relevance per document in a subset of the result set of documents (e.g., the top 25 results), a relevance difference between a first document of the result set of documents and a second document in the result set of documents (e.g., a tf-idf difference between the first document of the top 25 results and the twenty-fifty document of the top 25 results). In some embodiments, the estimated relevance score may be calculated based on a plurality of weighted score components, including a terms relevance component. In some embodiments, the estimated relevance score may be calculated as another function of the terms relevance.

The one or more results characteristics may include a terms relevance precipitation. The terms relevance precipitation may be indicative of a difference in relevance between a first document of the result set of documents and a second document of the result set of documents. In some embodiments, the terms relevance of the first document and the second document may be calculated in any of the ways described in the preceding paragraph. In some embodiments, the estimated relevance score is calculated based on the terms relevance precipitation. For example, a subset of relevant documents may be identified from the result set, such as when the "top 25" documents by tf-idf score are identified. The subset of documents may be ranked from highest terms relevance to lowest terms relevance. The terms relevance precipitation may be calculated in this example by subtracting the terms relevance of the lowest ranked document of the "top 25" documents from the terms relevance of the highest ranked document of the "top 25" documents. The estimated relevance score may be calculated as proportional to the terms relevance precipitation because a high difference in relevance between the highest ranked document in a subset and the lowest ranked document in the subset is indicative of an effective differentiation in the relevance of the documents of the subset and may be indicative of an effective natural language search query. In some embodiments, the estimated relevance score may be calculated based on a plurality of weighted score components, including a terms relevance precipitation component. In some embodiments, the estimated relevance score may be calculated as another function of the terms relevance precipitation.

The one or more results characteristics may include a best paragraphs terms prevalence. The best paragraph terms prevalence may be indicative of a number of extracted query terms and/or synonyms of the query terms included in at least one paragraph of at least one document of the result set of documents. For example, one or more paragraphs in a document in the result set may be identified as a "best paragraph" based on the presence of extracted query terms from the natural language search query and/or synonyms of the extracted query terms in the paragraph. The number of the query terms and/or synonyms of the query terms in the "best paragraph" may be calculated. The best paragraphs terms prevalence for an identified "best paragraph" may be calculated in a number of ways, including based on the absolute number of query terms in the identified "best paragraph," the absolute number of query terms and synonyms of the query terms in the identified "best paragraph," the ratio of query terms in the identified "best paragraph" to the total number of terms in the identified "best paragraph," the ratio of query terms and synonyms of the query terms in the "best paragraph" to the total number of terms in the identified "best paragraph," and the like. The estimated relevance score may be calculated based on the best paragraphs terms prevalence by using the best paragraphs terms prevalence of a single "best paragraph" from each document in the result set, by using the best paragraphs terms prevalence of multiple "best paragraphs" from each document in the result set, by using the best paragraphs terms prevalence of a single "best paragraph" from a subset of the documents in the result set, or by using the best paragraphs terms prevalence of multiple documents from a subset of the documents in the result set. In some embodiments, the estimated relevance score may be calculated based on a plurality of weighted score components, including a best paragraphs terms prevalence component. In some embodiments, the estimated relevance score may be calculated as another function of the best paragraphs terms prevalence.

The one or more results characteristics may include a topical diversity. The topical diversity may be indicative of a variance in topics within the result set of documents. The topical diversity may be calculated in a number of ways. For example, in the context of legal documents, the topical diversity may be calculated based on a degree that the extracted query terms match terms in a legal taxonomy (e.g., by comparing the extracted query terms to terms included in a separate legal taxonomy stored in the data storage component 36 or the memory component 40 of the server computing device 12b) or based on practice areas associated with documents in the result set (e.g., by comparing a practice area associated with the documents in the result set with a practice area of the natural language search query). The topical diversity may be calculated for the entire result set of documents or for a subset of the documents in the result set of documents. The estimated relevance score may be calculated based on the topical diversity. For example, the estimated relevance score may be calculated as inversely proportional to the topical diversity because a result set that is focused on a particular topic is more likely to be relevant to the search query than a result set that includes documents scattered among a number of topics. In some embodiments, the estimated relevance score may be calculated based on a plurality of weighted score components, including a topical diversity component. In some embodiments, the estimated relevance score may be calculated as another function of the topical diversity.

The one or more results characteristics may include a content variability. The content variability may be indicative of a variance in content within the result set of documents. The content variability may include a variance in recency among the result set of documents, a variance in jurisdiction (in the case of legal documents) among the result set of documents, a variance in invention class (in the case of patent documents) among the result set of documents, a variance in legal issues among the result set of documents, or the like. The content variability may be calculated for the entire result set of documents or for a subset of the documents in the result set of documents. The estimated relevance score may be calculated based on the content variability. For example, the estimated relevance score may be calculated as inversely proportional to the content variability because a result set that is focused on a particular content aspect is more likely to be relevant to the natural language search query than a result set that includes documents scattered among a number of content aspects. In some embodiments, the estimated relevance score may be calculated based on a plurality of weighted score components, including a content variability component. In some embodiments, the estimated relevance score may be calculated as another function of the content variability.

The one or more results characteristics may include a terms proximity. The terms proximity may be indicative of a proximity of the query terms within a portion of at least one document of the result set of documents. The proximity of the query terms within a portion of a document indicates the degree to which the terms are concentrated within the document versus distributed throughout the document. A document with a higher terms proximity is likely to be more relevant because it has a greater proportion of query terms proximate to one another. The terms proximity may be calculated in a number of ways, such as by determining an average number of words between query terms, by determining an average number of words between query terms in a paragraph of the document, or the like. The terms proximity may also be calculated based on the proximity between both query terms and synonyms to the query terms. The estimated relevance score may then be calculated based on the terms proximity for one or more of the documents in the result set. In some embodiments, the estimated relevance score may be calculated based on a plurality of weighted score components, including a terms proximity component. In some embodiments, the estimated relevance score may be calculated as another function of the terms proximity.

The terms proximity may also be calculating a terms-coverage for an algorithmically determined subset of relevant excepts (e.g., the 6 most relevant excerpts or the like). Once the terms-coverage has been calculated, a weighting may be applied to the determined subset of relevant excerpts (e.g., applying a 5-1-1-1-1-1 weighting). It should be understood that the terms coverage is a percentage of query terms that are included in an excerpt. For example, if the top excerpt contains all query terms, it may be weighted with a value of 5. Then, for the remaining excerpts, a terms-coverage percentage is added for each, and added to the value of 5 from the top excerpt as the score increases toward 10. As a result, the terms are scored on a scale of zero to 10 based on the above-mentioned calculation.

The one or more results characteristics may include a query to core terms ratio. The query to core terms ratio may be indicative of a degree of overlap between the extracted query terms and core terms in at least one document of the result set of documents. Each of the documents in the result set may include one or more terms identified as "core terms" for the document, which may be indicative of terms that summarize the content or focus of the document or terms that indicate important concepts within the document. The query to core terms ratio may be calculated by dividing the number of extracted query terms from the natural language query with the number of core terms in the document that are also query terms. A document with a lower query to core terms ratio is likely to be more relevant to a given search query. In some embodiments, the query to core terms ratio may be calculated by dividing the number of extracted query terms from the natural language search query with the number of core terms in the document that are also query terms or synonyms of the query terms. The estimated relevance score may then be calculated based on the query to core terms ratio for one or more of the documents in the result set. In some embodiments, the estimated relevance score may be calculated based on a plurality of weighted score components, including a query to core terms ratio component. In some embodiments, the estimated relevance score may be calculated as another function of the query to core terms ratio.

The one or more results characteristics may include a document recency indicator. The document recency indicator may be indicative of a date of at least one document of the result set of documents. In some contexts, such as the news or in a financial context, a document that is more recent is likely to be more relevant. The estimated relevance score may then be calculated based on the document recency indicator for one or more of the documents in the result set or for the result set as a whole. In some embodiments, the estimated relevance score may be calculated based on a plurality of weighted score components, including a document recency indicator. In some embodiments, the estimated relevance score may be calculated as another function of the document recency indicator.

The one or more query characteristics may include a number of documents in the result set of documents. In some embodiments, the estimated relevance score is calculated based on the number of documents in the result set of documents. For example, the estimated relevance score may be calculated as inversely proportional to the number of documents in the result set of documents. In some embodiments, the estimated relevance score may be calculated as a bell-shaped function of the number of documents in the result set of documents, such that the estimated relevance score is lower when there are a low number of documents in the result set of documents, higher when there are a medium number of documents in the result set of documents, and lower when there are a high number of documents in the result set of documents. In some embodiments, the estimated relevance score may be calculated based on a plurality of weighted score components, including a number of documents in the result set of documents. In some embodiments, the estimated relevance score may be calculated as another function of the number of documents in the result set of documents.

Examples of Weighted Estimated Relevance Score Components

As noted above, the estimated relevance score may be calculated based on a plurality of weighted score components, which may include one or more of the context characteristics, one or more of the natural language query characteristics, or one or more of the results characteristics described above. The estimated relevance score may have a value between 0% and 100% or 0 and 1. Of course, it should be understood that the estimated relevance score may vary between other lower bounds and upper bounds in other embodiments. In some embodiments, a weight is assigned to each of a plurality of weighted components used to calculate the estimated relevance score. In some embodiments in which the estimated relevance score varies between 0% and 100%, the weights of each of the weighted components add up to 100%. The particular components used to calculate the estimated relevance score and the weights of the components may vary based on the use case or the context, among other variables. A few non-limiting examples will now be provided of score components and their associated weights.

In a limited computing context, such as when a user utilizes a tablet or smartphone to perform a query, the following characteristics and weights may be used to calculate the estimated relevance score. In the limited computing context, the results characteristics may be determined for the entire result set or a subset of the result set, such as the top 25 documents.

TABLE 1

| Type | Component | Weight (%) |
|---|---|---|
| Context | User profile | 5 |
| Query | Number of query terms extracted from natural language query | 15 |
| | Inclusion of a filter | 20 |
| | Ambiguity score | 10 |
| Results | Number of documents in result set | 15 |
| | Terms relevance | 20 |
| | Terms relevance precipitation | 10 |
| | Document recency indicator | 5 |

In a more robust computing context, such as when a user utilizes a desktop or laptop computer, the following characteristics and weights may be used to calculate the estimated relevance score. In the more robust computing context, the results characteristics may be determined for the entire result set or a subset of the result set, such as the top 50 documents or the top 100 documents

TABLE 2

| Type | Component | Weight (%) |
|---|---|---|
| Context | User profile | 5 |
| Query | Number of query terms extracted from natural language query | 5 |
| | Inclusion of a filter | 5 |
| | Ambiguity score | 5 |
| | Degree of similarity to previous query | 5 |
| Results | Number of documents in result set | 5 |
| | Terms relevance | 15 |
| | Terms relevance precipitation | 10 |
| | Best paragraphs terms prevalence | 10 |
| | Topical diversity | 15 |
| | Terms proximity | 5 |
| | Query to core terms ratio | 10 |
| | Document recency indicator | 5 |

In some embodiments, it may be desirable to utilize only one type of characteristics to calculate the estimated relevance score. For example, in some embodiments, only results characteristics are utilized to calculate the estimated relevance score, such as shown in the non-limiting example below.

TABLE 3

| Type | Component | Weight (%) |
| --- | --- | --- |
| Results | Number of documents in result set | 10 |
| | Terms relevance | 15 |
| | Terms relevance precipitation | 10 |
| | Best paragraphs terms prevalence | 15 |
| | Topical diversity | 15 |
| | Terms proximity | 10 |
| | Query to core terms ratio | 15 |
| | Document recency indicator | 10 |

The particular components used to calculate the estimated relevance score and the weights of the components may vary based on the type of natural language query. For example, the components and weights shown in the charts above may be used for a case law search while the chart below may be used for a search for patent documents. The case law natural language search uses a topical diversity component while the patent natural language search uses a class/subclass diversity because topical diversity is more indicative of document relevance in the case law context while class/subclass diversity is more indicative of document relevance in the patent document context. The estimated relevance score for the patent document search does not include ambiguity score or document recency indicator because these characteristics may be useful in the case law context, but not useful in the patent document context.

TABLE 4

| Type | Component | Weight (%) |
| --- | --- | --- |
| Context | User profile | 5 |
| Query | Number of query terms extracted from natural language query | 5 |
| | Inclusion of a filter | 5 |
| | Degree of similarity to previous natural language query | 5 |
| Results | Number of documents in result set | 10 |
| | Terms relevance | 20 |
| | Terms relevance precipitation | 10 |
| | Best paragraphs terms prevalence | 10 |
| | Class/subclass diversity | 15 |
| | Terms proximity | 5 |
| | Query to core terms ratio | 10 |

Accordingly, it should be appreciated and understood that the particular components and the weights of the components that are used to calculate the estimated relevance score may vary based on a number of factors, such as the device used to perform the search, the type of search, the user performing the search, or the like.

Referring to FIGS. 2-4, the server computing device 12b may use the display logic 48 to update the graphical user interface 400 by generating/updating the query visualization and manipulation element 420 at block 316, generating/updating the related terms element 428 at block 318, color coding or otherwise distinguishing particular elements at block 320, adjusting node size at block 322, and/or providing excerpts of the document results 442 at block 324. In the embodiment depicted in FIG. 4, the graphical user interface 400 is updated to display relevant portions of the top four ranked documents of the result set of documents in the results listing element 440, the query visualization and manipulation element 420 is updated to show the various term nodes 422, topic nodes 424, and connectors 423, the related terms element 428 is updated to show the top five related terms and five additional related terms, color coding terms in the query visualization and manipulation element 420 to match corresponding terms shown in the excerpts of the document results 442. The feedback meter element 430 is also updated by adjusting the location of the slider element 432 to correspond to the breadth of the search query. The slider element 432 depicted in FIG. 4 indicates that the result set of documents identified by the initial search query is broad. The slider element 432 may provide a visual indication to a user of the user computing device 12a that the query can be narrowed when the search query is indicated as broad. As such, the user may manipulate the user computing device 12a to narrow the scope of the search by moving the slider to the right of the graphical user interface 400.

Still referring to FIGS. 2-4, at block 325, the server computing device 12b may determine whether any of the selected terms have been accepted by receiving inputs from a user via the user computing device 12a corresponding to a selection of one or more terms from the related terms element 428 and/or movement of the slider element 432 to broaden or narrow the scope of the search. If no input is received from the user, the determination may be made that the selected terms have not been selected and the method 300 may end. After the method 300 ends, the user may still be able to review the results in the results listing element 440, create a new query, or manipulate an existing query.

Still referring to FIGS. 2-4, in response to determining that the claim terms have been accepted by receiving inputs from the user computing device 12a that correspond to a user selection of one or more terms of the related terms element 428 and/or movement of the slider element 432, the process may move to block 328, whereby the query is updated to include the additional terms and/or to broaden or narrow the scope by adding or removing terms. At block 330, another determination may be made as to whether additional inputs have been received from a user via the user computing device 12a. For example, a user may further move the slider element 432 and/or further select terms from the related terms element and the server computing device 12b may receive additional inputs that correspond to the user's interaction with the user interface computing device 12a. If no additional inputs have been received, the process may return to block 308 to update the search to correspond to the new search terms and/or scope. If additional inputs have been received, the process may move to block 332, whereby the query is further adjusted, as described herein. The process may then continue to block 308 to update the search to correspond to the new search terms and/or scope.

Accordingly, it should be understood that embodiments described herein display estimated breadth indicators for result sets of documents based on calculated estimated breadth scores and/or the proximity of search terms within excerpts of the result set of documents based on calculated proximity scores. The displayed estimated breadth indicator/terms proximity indicator provides a useful visual indication of the degree to which the result set of documents are relevant to a natural language search query. Providing a visual indication of the degree to which a result set of document is relevant to a natural language search query may allow a user to formulate improved queries, inspect more relevant documents, and save time by reducing the amount of time spent inspecting irrelevant documents. Furthermore, the graphical user interfaces described herein may facilitate the generation of natural language search queries to ensure that a computing device conducting the search accurately searches for terms that are relevant to a user, the iterative refinement and manipulation of natural language search queries, and the understanding of the estimated relevance of query results in an intuitive and user-friendly manner such that a user may identify desired content and have confidence that the identified content is relevant.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter,

What is claimed is:

1. A method for providing for display an estimated breadth indicator for a result set of documents, the method comprising:
   receiving, at a computing device, a natural language search query comprising a plurality of search concepts;
   determining the plurality of search concepts from the natural language query;
   searching a database using the natural language search query to identify the result set of documents, wherein the result set of documents are identified based on the plurality of search concepts;
   calculating a breadth of the result set of documents, wherein the breadth is calculated from an estimated relevance score that is indicative of a degree to which the result set of documents are relevant to the search query; and
   providing for display, the breadth as a feedback meter element, wherein the feedback meter element provides a visual indication of the breadth of the natural language search query.

2. The method of claim 1, further comprising:
   determining one or more context characteristics indicative of a context of the natural language search query, wherein the breadth of the result set of documents is calculated based on the one or more context characteristics.

3. The method of claim 2, wherein the one or more context characteristics includes one or more of: a user profile, a device type, a geographic location, and a network location.

4. The method of claim 1, further comprising:
   determining one or more query characteristics indicative of a characteristic of the natural language search query, wherein the breadth of the result set of documents is calculated based on the one or more query characteristics.

5. The method of claim 4, wherein the one or more query characteristics include a number of query terms, an inclusion of a recognized phrase, an inclusion of a citation, an inclusion of a filter, or a degree of similarity to at least one previous natural language search query.

6. The method of claim 1, further comprising:
   determining one or more results characteristics indicative of a characteristic of the result set of documents, wherein the breadth of the result set of documents is calculated based on the one or more results characteristics.

7. The method of claim 6, wherein the one or more results characteristics includes at least one of:
   a terms relevance indicative of an extent to which query terms match one or more terms in at least one document of the result set of documents,
   a terms relevance precipitation indicative of a difference in relevance between a first document of the result set of documents and a second document of the result set of documents,
   a best paragraphs terms prevalence indicative of a number of the query terms and synonyms of the query terms included in at least one paragraph of at least one document of the result set of documents,
   a topical diversity indicative of a variance in topics within the result set of documents,
   a terms proximity indicative of a proximity of the query terms within a portion of at least one document of the result set of documents,
   a query to core terms ratio indicative of a degree of overlap between the query terms and core terms in at least one document of the result set of documents,
   a document recency indicator indicative of a date of at least one document of the result set of documents, and
   a number of documents in the result set of documents.

8. The method of claim 1, wherein the breadth is determined based on a plurality of weighted score components.

9. The method of claim 1, further comprising providing one or more suggested search terms for improving the search results or for adjusting the breadth of the result set of documents.

10. A method for providing for display an indicator of terms proximity for a result set of documents, the method comprising:
    receiving, at a computing device, a natural language search query comprising a plurality of search concepts;
    determining the plurality of search concepts from the natural language query;
    searching a database using the natural language search query to identify the result set of documents, wherein the result set of documents are identified based on the plurality of search concepts;
    calculating a proximity of terms within the result set of documents, wherein the proximity of terms is calculated from a coverage of terms in a subset of relevant excerpts from the result set of documents; and
    providing for display, the proximity of terms as a feedback meter element, wherein the feedback meter element provides a visual indication of the proximity of terms within the result set of documents generated from the natural language search query.

11. The method of claim 10, wherein the coverage of terms represents a percentage of query terms from the natural language query that appear in an excerpt of the subset of relevant excerpts from the result set of documents.

12. A system for providing for display an estimated breadth indicator for a result set of documents, the system comprising:
    a processing device; and
    a non-transitory, processor-readable storage medium comprising one or more programming instructions thereon that, when executed, cause the processing device to:
    receive a natural language search query comprising a plurality of search concepts;
    determine the plurality of search concepts from the natural language query;
    search a database using the natural language search query to identify the result set of documents, wherein the result set of documents are identified based on the plurality of search concepts;
    calculate a breadth of the result set of documents, wherein the breadth is calculated from an estimated relevance score that is indicative of a degree to which the result set of documents are relevant to the search query; and provide for display, the breadth as a feedback meter element, wherein the feedback meter element provides a visual indication of the breadth of the natural language search query.

13. The system of claim 12, wherein the one or more programming instructions, when executed, further cause the processing device to:
determine one or more context characteristics indicative of a context of the natural language search query, wherein the breadth of the result set of documents is calculated based on the one or more context characteristics.

14. The system of claim 13, wherein the one or more context characteristics includes one or more of: a user profile, a device type, a geographic location, and a network location.

15. The system of claim 12, wherein the one or more programming instructions, when executed, further cause the processing device to:
determine one or more query characteristics indicative of a characteristic of the natural language search query, wherein the breadth of the result set of documents is calculated based on the one or more query characteristics.

16. The system of claim 15, wherein the one or more query characteristics include a number of query terms, an inclusion of a recognized phrase, an inclusion of a citation, an inclusion of a filter, or a degree of similarity to at least one previous natural language search query.

17. The system of claim 12, wherein the one or more programming instructions, when executed, further cause the processing device to:
determine one or more results characteristics indicative of a characteristic of the result set of documents, wherein the breadth of the result set of documents is calculated based on the one or more results characteristics.

18. The system of claim 17, wherein the one or more results characteristics includes at least one of:
a terms relevance indicative of an extent to which query terms match one or more terms in at least one document of the result set of documents,
a terms relevance precipitation indicative of a difference in relevance between a first document of the result set of documents and a second document of the result set of documents,
a best paragraphs terms prevalence indicative of a number of the query terms and synonyms of the query terms included in at least one paragraph of at least one document of the result set of documents,
a topical diversity indicative of a variance in topics within the result set of documents,
a terms proximity indicative of a proximity of the query terms within a portion of at least one document of the result set of documents,
a query to core terms ratio indicative of a degree of overlap between the query terms and core terms in at least one document of the result set of documents,
a document recency indicator indicative of a date of at least one document of the result set of documents, and
a number of documents in the result set of documents.

19. The system of claim 12, wherein the breadth is determined based on a plurality of weighted score components.

20. The system of claim 12, wherein the one or more programming instructions, when executed, further cause the processing device to:
provide one or more suggested search terms for improving the search results or for adjusting the breadth of the result set of documents.

* * * * *

UNITED STATES PATENT AND TRADEMARK OFFICE
CERTIFICATE OF CORRECTION

PATENT NO. : 10,635,679 B2  
APPLICATION NO. : 15/952896  
DATED : April 28, 2020  
INVENTOR(S) : Miller et al.

Page 1 of 1

It is certified that error appears in the above-identified patent and that said Letters Patent is hereby corrected as shown below:

In the Specification

In Column 25, Line(s) 11, after "matter", delete "," and insert --.--, therefor.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*